(12) United States Patent
Croasdale et al.

(10) Patent No.: US 9,732,518 B2
(45) Date of Patent: Aug. 15, 2017

(54) SYSTEM AND METHODS FOR THERMAL ISOLATION OF COMPONENTS USED

(71) Applicants: Scott Croasdale, Burnaby (CA); Douglas James Knight, Deer Park, WA (US)

(72) Inventors: Scott Croasdale, Burnaby (CA); Douglas James Knight, Deer Park, WA (US)

(*) Notice: Subject to any disclaimer, the term of this patent is extended or adjusted under 35 U.S.C. 154(b) by 0 days.

(21) Appl. No.: 14/642,431

(22) Filed: Mar. 9, 2015

(65) Prior Publication Data

US 2015/0184376 A1 Jul. 2, 2015

Related U.S. Application Data

(63) Continuation of application No. 13/683,497, filed on Nov. 21, 2012, now Pat. No. 8,973,334, which is a
(Continued)

(51) Int. Cl.
*E04C 2/38* (2006.01)
*E04B 2/56* (2006.01)
(Continued)

(52) U.S. Cl.
CPC ............... *E04B 2/562* (2013.01); *E04B 1/40* (2013.01); *E04B 1/76* (2013.01); *E04B 1/7604* (2013.01); *E04B 1/7608* (2013.01); *E04B 1/7629* (2013.01); *E04B 1/7637* (2013.01); *E04B 1/80* (2013.01); *E04B 2/58* (2013.01); *E04F 13/0733* (2013.01); *E04F 13/0805* (2013.01);
(Continued)

(58) Field of Classification Search
CPC ...... E04B 2/562; E04B 1/7604; E04B 1/7608; E04B 1/7637; E04B 1/40; E04B 2/58; E04B 1/7629; E04B 1/80; E04B 1/76; E04B 2103/06; E04B 2103/04; E04B 2001/7679; E04B 1/762; E04B 1/94; E04B 2/7412; E04B 2001/2481; E04F 13/0875; E04F 13/0805; E04F 13/12; E04F 13/0862; E04F 13/14; E04F 13/0733; B32B 2607/00; F16B 43/001
USPC ........................................... 52/309.4, 717.02
See application file for complete search history.

(56) References Cited

U.S. PATENT DOCUMENTS 519,952 A 5/1894 Hayes
2,696,281 A * 12/1954 Hedgren et al. ............... 52/553
(Continued)

FOREIGN PATENT DOCUMENTS

| CH | 690967 | 3/2001 |
|---|---|---|
| DE | 2702459 | 7/1977 |

(Continued)

*Primary Examiner* — Brian Glessner
*Assistant Examiner* — Joshua Ihezie (57) ABSTRACT

An isolator system for preventing the conduction of thermal energy between the metal components of a wall assembly comprising isolator plates adapted to be placed between the metal components of a wall assembly and made of an insulating material. The isolator plates include at least one opening for receiving a fastener, said opening has an annular shoulder adapted to extend into an opening for receiving said fastener in a metal component of a wall assembly. Also disclosed herein is a thermal isolation washer and a girt for use with polymer panel construction.

16 Claims, 9 Drawing Sheets

Related U.S. Application Data continuation-in-part of application No. 12/928,151, filed on Dec. 6, 2010, now Pat. No. 8,429,866.

(51) Int. Cl.
| | |
|---|---|
| *E04B 1/76* | (2006.01) |
| *E04B 1/80* | (2006.01) |
| *E04F 13/073* | (2006.01) |
| *E04F 13/08* | (2006.01) |
| *E04F 13/12* | (2006.01) |
| *E04F 13/14* | (2006.01) |
| *E04B 1/41* | (2006.01) |
| *E04B 2/58* | (2006.01) |
| *E04B 1/94* | (2006.01) |
| *E04B 2/74* | (2006.01) |
| *F16B 43/00* | (2006.01) |
| *E04B 1/24* | (2006.01) |

(52) U.S. Cl.
CPC ...... *E04F 13/0862* (2013.01); *E04F 13/0875* (2013.01); *E04F 13/12* (2013.01); *E04F 13/14* (2013.01); *B32B 2607/00* (2013.01); *E04B 1/762* (2013.01); *E04B 1/94* (2013.01); *E04B 2/7412* (2013.01); *E04B 2001/2481* (2013.01); *E04B 2001/7679* (2013.01); *E04B 2103/04* (2013.01); *E04B 2103/06* (2013.01); *F16B 43/001* (2013.01)

(56) References Cited

U.S. PATENT DOCUMENTS

| | | | | |
|---|---|---|---|---|
| 2,860,504 | A | | 11/1958 | Sinner et al. |
| 3,217,455 | A | * | 11/1965 | Burges ........................ 52/404.2 |
| 3,266,207 | A | * | 8/1966 | Birum, Jr. ...................... 52/459 |
| 3,427,775 | A | * | 2/1969 | Bachrich ........................ 52/402 |
| 3,839,839 | A | | 10/1974 | Tillisch et al. |
| 3,899,989 | A | * | 8/1975 | Glazebrook ..................... 114/84 |
| 3,939,618 | A | * | 2/1976 | Murphy ........................ 52/274 |
| 3,978,626 | A | | 9/1976 | Weinar |
| 4,009,549 | A | | 3/1977 | Hala |
| 4,056,904 | A | | 11/1977 | Dawdy |
| 4,070,835 | A | | 1/1978 | Reverend |
| 4,074,486 | A | | 2/1978 | Grearson |
| 4,171,172 | A | | 10/1979 | Johnston |
| 4,250,678 | A | * | 2/1981 | Skuran ........................ 52/478 |
| 4,346,543 | A | * | 8/1982 | Wilson et al. ................ 52/404.2 |
| 4,478,018 | A | * | 10/1984 | Holand ........................ 52/220.1 |
| 4,506,482 | A | | 3/1985 | Pracht et al. |
| 4,523,413 | A | | 6/1985 | Koppenberg |
| 4,566,239 | A | * | 1/1986 | Smigel et al. ................ 52/407.4 |
| 4,571,909 | A | * | 2/1986 | Berghuis et al. ............. 52/309.8 |
| 4,641,468 | A | * | 2/1987 | Slater ........................ 52/309.4 |
| 4,646,498 | A | | 3/1987 | Schneller et al. |
| 4,669,235 | A | | 6/1987 | Reinen |
| 4,680,905 | A | | 7/1987 | Rockar |
| 4,897,976 | A | | 2/1990 | Williams et al. |
| 5,063,722 | A | * | 11/1991 | Hohmann ...................... 52/410 |
| 5,065,559 | A | | 11/1991 | Zegel et al. |
| 5,092,100 | A | | 3/1992 | Lambert et al. |
| 5,094,052 | A | | 3/1992 | Gudmundsson et al. |
| 5,216,859 | A | | 6/1993 | Moreno et al. |
| 5,285,607 | A | | 2/1994 | Somerville |
| 5,323,577 | A | | 6/1994 | Whitmyer |
| 5,347,781 | A | | 9/1994 | Hanlon |
| 5,367,853 | A | | 11/1994 | Bryan |
| 5,379,561 | A | | 1/1995 | Saito |
| 5,417,050 | A | | 5/1995 | Cosentino |
| 5,435,679 | A | * | 7/1995 | Barry ........................ 411/339 |
| 5,473,851 | A | | 12/1995 | Northrup, Jr. |
| 5,544,461 | A | | 8/1996 | Sommerstein |
| 5,619,834 | A | | 4/1997 | Chen |
| 5,628,161 | A | * | 5/1997 | Giannuzzi et al. ............. 52/698 |
| 5,644,883 | A | | 7/1997 | Menchetti |
| 5,749,192 | A | | 5/1998 | Menchetti |
| 5,758,464 | A | | 6/1998 | Hatton |
| 5,761,864 | A | | 6/1998 | Nonoshita |
| 5,799,454 | A | | 9/1998 | Andersson et al. |
| 5,816,008 | A | | 10/1998 | Hohmann |
| 5,857,817 | A | * | 1/1999 | Giannuzzi et al. ........... 411/82.3 |
| 5,924,256 | A | * | 7/1999 | Ito ........................ 52/481.1 |
| 5,953,883 | A | | 9/1999 | Ojala |
| 5,970,671 | A | | 10/1999 | Bifano et al. |
| 6,076,320 | A | | 6/2000 | Butler |
| 6,094,883 | A | * | 8/2000 | Atkins ........................ 52/746.11 |
| 6,125,608 | A | | 10/2000 | Charlson |
| 6,128,883 | A | | 10/2000 | Hatzinikolas |
| 6,138,423 | A | | 10/2000 | Poutanen et al. |
| 6,209,281 | B1 | * | 4/2001 | Rice ........................ 52/714 |
| 6,230,467 | B1 | | 5/2001 | Leek |
| 6,250,035 | B1 | | 6/2001 | Bristow et al. |
| 6,263,636 | B1 | | 7/2001 | Corston |
| 6,367,219 | B1 | * | 4/2002 | Quinlan ........................ 52/506.06 |
| 6,401,417 | B1 | | 6/2002 | Leblang |
| 6,421,972 | B1 | | 7/2002 | Dalphond et al. |
| 6,502,362 | B1 | | 1/2003 | Zambelli et al. |
| 6,594,965 | B2 | | 7/2003 | Coulton |
| 6,745,531 | B1 | | 6/2004 | Egan |
| 6,786,013 | B2 | | 9/2004 | Coulton |
| 6,944,997 | B2 | | 9/2005 | Verkamp |
| 7,024,825 | B2 | | 4/2006 | Kebeli |
| 7,043,844 | B2 | | 5/2006 | Lin |
| 7,070,165 | B2 | * | 7/2006 | Jornod ........................ 251/291 |
| 7,127,858 | B2 | | 10/2006 | Layfield |
| 7,191,570 | B1 | | 3/2007 | Eaton |
| 7,254,925 | B2 | | 8/2007 | Stefanutti et al. |
| 7,421,826 | B2 | | 9/2008 | Collins et al. |
| 7,543,419 | B2 | | 6/2009 | Rue |
| 7,617,638 | B1 | | 11/2009 | Slama et al. |
| 7,712,273 | B2 | * | 5/2010 | Panasik ................ E04D 3/361 |
| | | | | 52/459 |
| 7,818,934 | B2 | * | 10/2010 | Hall et al. .................... 52/302.6 |
| 7,823,357 | B2 | * | 11/2010 | Westra ........................ 52/573.1 |
| 7,895,803 | B2 | * | 3/2011 | Downey ................ E04B 1/82 |
| | | | | 248/610 |
| 8,037,653 | B2 | | 10/2011 | Hohmann, Jr. |
| 8,201,374 | B2 | | 6/2012 | Hohmann |
| 8,407,957 | B2 | | 4/2013 | McClure |
| 8,429,866 | B2 | | 4/2013 | Knight et al. |
| 8,511,036 | B2 | | 8/2013 | O'Donnell |
| 8,667,765 | B1 | | 3/2014 | McCarthy |
| 8,683,772 | B2 | | 4/2014 | Friis |
| 8,720,141 | B2 | | 5/2014 | Shembekar et al. |
| 8,739,494 | B2 | * | 6/2014 | Francavilla ................ 52/741.13 |
| 8,826,624 | B2 | | 9/2014 | Dalen |
| 8,839,587 | B2 | | 9/2014 | Hohmann |
| 2002/0194805 | A1 | | 12/2002 | Arseneau et al. |
| 2003/0037499 | A1 | | 2/2003 | Coulton |
| 2003/0070388 | A1 | | 4/2003 | Catani et al. |
| 2004/0006942 | A1 | | 1/2004 | Greenway |
| 2004/0055236 | A1 | * | 3/2004 | Keith ........................ 52/410 |
| 2004/0216408 | A1 | * | 11/2004 | Hohmann, Jr. ................ 52/426 |
| 2004/0217320 | A1 | | 11/2004 | Jornod |
| 2004/0221518 | A1 | * | 11/2004 | Westra ........................ 52/79.1 |
| 2005/0076592 | A1 | | 4/2005 | Kebeli |
| 2005/0204660 | A1 | * | 9/2005 | Tiirola ........................ 52/220.1 |
| 2005/0284053 | A1 | | 12/2005 | Grunewald et al. |
| 2007/0068111 | A1 | | 3/2007 | Buntain et al. |
| 2007/0193151 | A1 | | 8/2007 | Anderson |
| 2007/0204541 | A1 | | 9/2007 | Sade |
| 2007/0207305 | A1 | | 9/2007 | Hord et al. |
| 2009/0000244 | A1 | | 1/2009 | O'Neal |
| 2009/0094923 | A1 | | 4/2009 | Weir et al. |
| 2010/0005749 | A1 | | 1/2010 | Abdel-Sayed et al. |
| 2010/0025984 | A1 | | 2/2010 | Kullen et al. |
| 2010/0037552 | A1 | * | 2/2010 | Bronner ........................ 52/713 |
| 2010/0083606 | A1 | * | 4/2010 | Davis et al. ................ 52/656.9 |
| 2010/0146893 | A1 | | 6/2010 | Dickinson |
| 2010/0175344 | A1 | | 7/2010 | Gadd |
| 2010/0287865 | A1 | | 11/2010 | Hatzinikolas |
| 2011/0047919 | A1 | * | 3/2011 | Hohmann, Jr. ................ 52/513 |
| 2011/0296781 | A1 | | 12/2011 | McCary |
| 2012/0031019 | A1 | * | 2/2012 | Stearns et al. ................ 52/173.3 |

(56) References Cited

U.S. PATENT DOCUMENTS

| | | | |
|---|---|---|---|
| 2012/0124930 A1 | 5/2012 | McClure | |
| 2012/0131872 A1 | 5/2012 | Kim | |
| 2012/0180422 A1 | 7/2012 | Noturno | |
| 2012/0192516 A1* | 8/2012 | Hillers | 52/309.4 |
| 2012/0227342 A1 | 9/2012 | McClure | |
| 2012/0260596 A1 | 10/2012 | Boese | |
| 2012/0304576 A1* | 12/2012 | Hohmann, Jr. | 52/513 |
| 2012/0308330 A1 | 12/2012 | Hohmann, Jr. | |
| 2013/0008121 A1* | 1/2013 | Dalen | 52/704 |
| 2014/0208681 A1* | 7/2014 | Rice | 52/712 |
| 2014/0325928 A1* | 11/2014 | White et al. | 52/506.05 |
| 2014/0353435 A1* | 12/2014 | Liu et al. | 248/74.1 |
| 2015/0128518 A1* | 5/2015 | Knight et al. | 52/404.1 |
| 2015/0176268 A1 | 6/2015 | Knight et al. | |

FOREIGN PATENT DOCUMENTS

| | | |
|---|---|---|
| DE | 3215932 | 10/1983 |
| EP | 1233118 A2 | 8/2002 |
| EP | 1310612 A2 | 5/2003 |

\* cited by examiner

SYSTEM AND METHODS FOR THERMAL ISOLATION OF COMPONENTS USED

CROSS-REFERENCE TO RELATED APPLICATIONS

This application is a continuation of U.S. patent application Ser. No. 13/683,497, filed Nov. 21, 2012, now U.S. Pat. No. 8,973,334, which is a continuation-in-part of U.S. patent application Ser. No. 12/928,151, filed Dec. 6, 2010, now U.S. Pat. No. 8,429,866. The entire disclosure of these references is hereby incorporated by reference.

BACKGROUND OF THE INVENTION

The construction, maintenance, and habitation of buildings is the single biggest contributor of greenhouse gases, and heating and cooling systems account for up to 50% of energy used in buildings in the United States. Reducing the energy used to heat and cool buildings is critical to energy conservation, and energy conservation is critical to both national security and economic prosperity.

A variety of governmental and non-governmental organizations are causing a tightening of energy efficiency standards as they pertain to buildings. In 1992, Congress passed the Energy Policy Act which required states to have building codes that set efficiency standards that are at least as stringent as the Federal standard. The American Society of Heating, Refrigerating and Air-Conditioning Engineers (ASHRAE) standard 90.1 "Energy Standards for Buildings Except Low Rise Residential Buildings" is followed by most states who update their state codes as 90.1 is updated. The 2030 Challenge, adopted by the US Conference of Mayors, AIA, USGBC, ASHRAE, and other important governmental and non-governmental organizations, requires new buildings to reduce energy use by 60% in 2010, 70% by 2015, 80% by 2020, 90% by 2025, and to achieve carbon neutrality by 2030. Meeting these tighter standards will require improvements in design and construction.

Energy efficiency is not the only demand made of construction. The building envelope, or the enclosure, must withstand occupant loads, wind loads, fire, precipitation, and humidity and condensation, as well as insulate the building. These requirements are codified through a number of standards. In addition to ASHRAE standard 90.1-2007, National Fire Protection Association (NFPA) standard 285 identifies flame propagation requirements for exterior non-load bearing wall assemblies used in non-combustible construction. American Society for Testing and Materials (ASTM) standard E-331 dictates water barrier property requirements. ASTM E-2357 dictates air barrier property requirements. Additionally, exterior-facing and interior, room-facing wall surfaces must be aesthetically appealing.

To meet these different requirements, a building envelope is constructed of a number of different materials, typically applied in layers. The walls of buildings are commonly constructed from frames composed of studs attached at their bases to a wall plate and at their tops to a ceiling plate. A wall assembly is built by attaching multiple building components to and within the frame. Non-combustible walls are commonly constructed with steel framing which provides the basic structure. Layers are applied to the framing to meet aesthetic and performance requirements. These layers typically sheathing, which can be made of exterior grade gypsum board. Gypsum board adds to the strength of the wall, and can provide fire resistance as well as serving as a base for moisture, air, or vapor layers. One or more moisture, air, or vapor resistant barriers formed of material such as asphalt impregnated paper, plastic sheeting, or building wrap is typically located outside the sheathing. Insulating layers such as mineral wool insulation or other insulation reduce heat transfer through the wall. External finishing cladding provides additional protection and makes the wall visually appealing. Drywall, or interior gypsum wall board, is often used to finish an interior wall as well as to provide further fire protection. Fiber batting insulation installed within the cavities between studs contributes reducing heat loss. Walls may also be made of concrete, which also comprises metal support structures, the inclusion of moisture, air, and/or vapor barriers, and fastening systems which hold the various components together.

The studs, or wall frame, provide the structural strength of the wall and form a base to apply the various layers which function to resist wind loads, repel moisture, and maintain internal temperature. The envelope and the methods used to affix its constituent materials to the studs must withstand all forces experienced by the building. Wind blowing against a building exerts a positive pressure on the windward side and suction, or negative pressure, against the leeward side. Depending on the wind, negative pressures can be exerted against other sides of the building or the roof. Internal pressures from stack effect or mechanical systems also act on the building envelope. Thus, all materials need to be attached with fastening systems that can resist not only the weight of the materials themselves, but the compressive and negative forces of wind, and wind-created negative pressures. Fastening systems must also be able to resist deformation. The weight of a façade or exterior cladding installed over several inches of insulation can create a large moment of force and shear force which act on fasteners extending through materials positioned between studs and the exterior cladding. Ineffective fasteners can creep over time, resulting in building component damage and failures. For example, if fastening systems do not protect the interior insulating layers against the forces exerted by exterior layers, insulating materials can be crushed or deformed and lose insulating properties.

For these reasons, building envelopes are conventionally constructed with robust fastening systems such as metal Z gifts installed over the exterior sheathing, allowing insulation to be installed on the exterior and providing a structural base for the cladding. Such fastening systems are strong because they involve a significant amount of material, employ large surface areas which can provide continuous support to components such as panels, and thereby enable the constituent elements of the building envelope to withstand the various forces they are expected to encounter. Unfortunately, cladding fastening systems also tend to undermine the effectiveness of the exterior insulation by creating thermal bridges, commonly lowering the effective R-value of the completed wall assembly to less than required by the energy codes and standards.

Heat flows from higher temperature regions to lower temperature regions through conduction, convection, or radiation. Materials that conduct heat well are called conductors, and materials that do not conduct heat well are called insulators. Thermal resistance is a measure of heat flow. Under uniform conditions, it is the ratio of the temperature difference across an insulator and the heat flux. It is typically expressed as an R-value in construction arts. Conductors have low R-values and insulators have high R-values.

An assembly's effective R-value is calculated by area, by averaging R-values of the various components which are parallel (side by side) and adding R-values of components that are in series (layers). The effective R-value of an assembly will be less than the R-value of the insulation component due to parallel heat flow through more conductive components. In light gauge steel-framed assemblies, heat flows through the steel studs can mean that the R-value of the wall is less than half of the R-value of the insulation used in the wall. Designers, contractors and code officials often mistakenly equate the insulation R value and the wall R value and do not recognize that the metal conducts heat well and significantly reduces the R value of the actual wall below the R value of the insulation itself.

Any thermally conductive part of an assembly that forms a pathway through insulating materials lowers the R-value of a building envelope. Studs and tracks, fasteners, structural members, and cladding support structures are all conductive. When conductive materials are used to fasten materials to wall frames, they contact the frames and extend through insulating layers, creating a path of least thermal resistance from the warm studs to the cold exterior and facilitating parallel heat loss through the wall. The warm building interior will warm wall studs, and that heat is easily conducted to the bracket or Z girt that is in substantial contact with the steel stud, and those brackets and Z girts extend through the insulation so that the heat is channeled to the cold exterior of the building. The surface area of brackets and Z girts that protrude through the insulation especially enables them to radiate the heat into the cold environment outside the insulating layer of the building. This phenomena is also known as a "fin effect." As a result, the wall in question will have an inadequate R-value and the problem gets worse with increasing levels of insulation. Additionally, the thermal bridges will create warm or cold spots within a wall, which can lead to condensation and resulting mold and water damage.

In response, the conventional approach in the building industry is to use a thicker layer of insulation. However, this solution does not resolve the thermal bridging problem because the cladding is still attached to metal components which extend through the insulation. Adding insulation around thermal bridges has no impact on the conductive nature of the thermal bridge. If enough insulation is added, the wall as a whole may eventually achieve the target R-value, but the problems caused by the creation of warm or cold spots within the wall will persist. The law of diminishing returns applies. Each additional thickness of insulation has decreasing effectiveness. The first few inches of insulation deliver the most efficiency, and each additional inch yields less return. Eventually additional insulation does not contribute any added insulation value. Therefore walls with significant thermal bridges may never meet their intended R value.

A wall with a thermal bridge may be analogized to a bucket with a hole in it. Adding insulation without breaking thermal bridges is like increasing the thickness of the walls of the bucket but not plugging the hole.

Metal fasteners are used despite these disadvantages because of the high strength of metals such as steel, and the fact that metal fasteners can be economically manufactured in a variety of different configurations using known methods. No other material offers this combination of attributes in this context. What is needed are methods of using metal fasteners to fasten elements of a building envelope to studs that interrupt the thermal bridges created by those metal fasteners. However, any such methods must withstand the demands that occupants, environmental forces, and gravity make on building envelopes. The structural integrity of buildings is critical to human health and safety. The fasteners that hold together buildings must withstand the various positive and negative pressures of wind, the substantial weight of the envelope components, and extraordinary events such as hurricanes and earthquakes. Fundamental technologies such as steel brackets connected to steel studs with steel bolts have a long, established history of withstanding these forces and keeping people safe. What is still needed is means of interrupting the thermal bridges created by metal fastening systems which does not impair the structural integrity of those fastening systems.

Conventionally, building envelopes include a structural layer such as gypsum board and an insulating layer such as mineral wool, both of which are affixed to wall frames. However, Dow produces and markets polymeric foam boards which provide both structure and insulation. Dow markets this product under the THERMAX trademark. These polymeric foam boards are described in US Pub. No. 2009/0320397. As Dow notes in the referenced published patent application, however, metal fasteners must extend through the insulating polymeric boards and attach to the metal wall frame. See paragraph 38. These metal fasteners create thermal bridges which compromise the effectiveness of the insulation. Moreover, these boards provide substantial structural strength—far more than mineral wool insulation. Traditional methods of mounting cladding to a conventional wall such as Z-girts do not take advantage of the properties of rigid foam boards, which are capable of withstanding considerable compressive force, especially spread over significant surface area. A method of mounting cladding to foam boards such as THERMAX in a way that does not create thermal bridges would be desirable.

SUMMARY OF THE INVENTION

Disclosed herein is an isolator system for preventing the conduction of thermal energy between two metal components of a wall assembly comprising: an isolator plate for placement between a wall stud and a fastening member having a surface area adapted to be placed in communication with said wall stud, said plate comprised of an insulating material and sized to be approximately coextensive with said surface area of said fastening member which is in communication with said wall stud, said plate including at least one opening for receiving a fastener, said opening including an annular shoulder adapted to extend into an opening for receiving said fastener in said fastening member.

Also disclosed herein is a wall assembly comprising: a support structure comprised of metal studs having two ends, one said end being affixed to a wall plate and the other said end being affixed to a ceiling plate; one or more fastening members comprised of metal and having a surface area in communication with a portion of said support structure, said surface area and said portion of said support structure defining a region between said fastening member and said support structure; an isolator plate comprised of insulating material and located in and configured to be approximately coextensive with said region; a fastener extending through openings in each said support structure, said fastening member, and said isolator plate; and said opening in said isolator plate being surrounded by an annular shoulder which extends into said opening in said fastening member.

Also disclosed herein is a wall assembly, comprising: a support structure comprised of metal studs having two ends, one said end being affixed to a wall plate and the other said end being affixed to a ceiling plate; one or more insulating foam panels; one or more girts having an approximately rectangular cross section and at least three sides; one or more fasteners extending through openings in said girts, said fasteners extending through said panels and having terminal ends attached to said support structures; and an isolating washer mounted on each said fastener, said isolating washers configured and located to prevent contact between said fastener and said girt.

DETAILED DESCRIPTION

Figure 1:
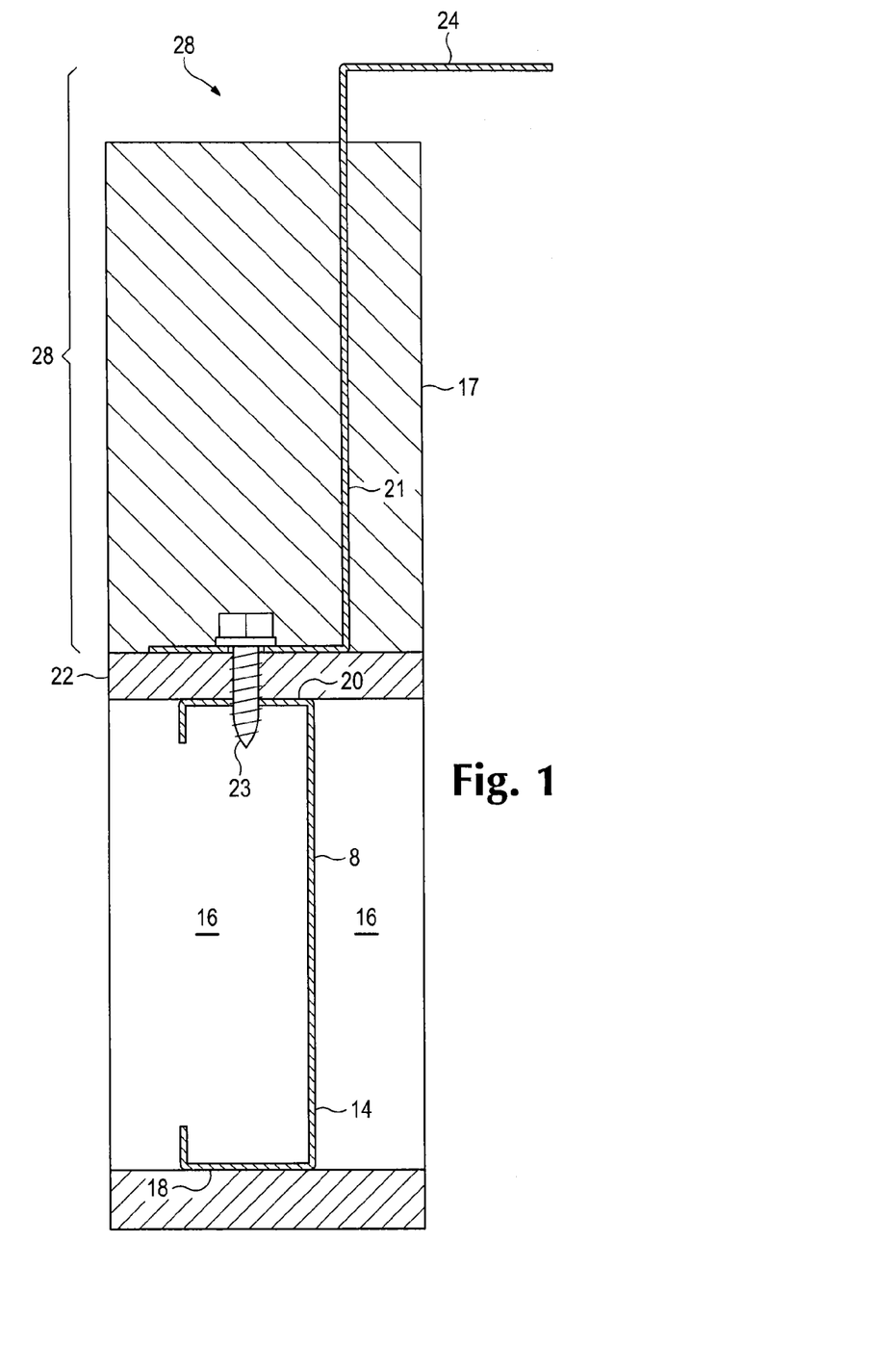
FIG. 1 is a cross sectional view of a conventional wall assembly.

As shown in FIG. 1, a wall structure is commonly formed of vertical wall studs 8 that are spaced apart from each other and attached to a wall plate (not shown) at one end and a ceiling plate (not shown) at the other end. The studs form cavities 16 between them, and are commonly formed from steel. They are rigidly interconnected to both the wall plate and the ceiling plate, forming a support structure 14. The support structure 14 has an opposing inside facing aspect 18 and an outside facing aspect 20, corresponding to the building interior facing aspect of the wall and the building exterior facing aspect of the wall. Adjoining walls form corners with various angles, and window openings and door openings are commonly defined.

The elements of the building envelope are attached to the support structure 14. Conventionally, sheathing 22 such as plywood, oriented strand board, or exterior grade gypsum board may be attached to the outside facing aspect 20 of the support structure 14 to form a rigid envelope layer. Insulation 17 such as mineral wool is attached to the structure, as is a weather resistant barrier (not shown). Cladding (not shown) is affixed as the outermost layer of the building envelope.

Alternatively, stiff, insulating polymer foam boards 19 such as DuPont THERMAX boards may be attached directly to the support structure 14 and the sheathing and mineral wool insulation layers may be omitted. An additional weather resistant barrier may be affixed directly to the support structure or to the polymer boards. Cladding is affixed as the outermost layer of the building envelope.

Conventionally, all of the layers of the building envelope must be fastened securely to the support structure 14 in a way that allows them to withstand wind, gravity, and occupant loads as well as moisture and temperature changes. Screws, brackets, and girts made of steel are conventionally used to accomplish this. Girts are typically horizontal structural members, but they can be used in a vertical orientation as well. They can have a variety of cross sections, including Z shapes. A Z girt 21 is shown in FIG. 1. They can be used as stabilizing elements in the primary structure, and they can support wall cladding or other elements of the building envelope. In order to perform these functions, they need to be securely fastened to the steel studs 8 which make up the support structure 14. Typically they are bolted or screwed to the studs 8. The screws that fasten girts to studs may extend through layers of intervening material, such as sheathing or even insulation. If a girt is fastened directly to a stud, a portion of the surface area of the girt and a portion of the surface area of the stud are in direct contact. If material such as sheathing is placed between the girt and the stud, then the corresponding surface area 29 of the girt 21 and the surface area 31 of the stud 8 are in communication with one another, in that stress felt by the girt is transmitted to the stud via the communicating surface areas. Because they typically support loads exerted against the cladding by gravity and because they are subject to shear forces, negative pressures, and positive pressures, girts typically maximize surface contact with or communication with steel studs so that the stress exerted on the girt is spread over as much surface area as possible, and this communication or contact between relatively large surface areas reduces the load on the bolts or screws connecting the two components together.

A variety of fastening members 32 can be used to fasten elements of a building envelope to a support structure, including girts, brackets, and other structures. Fasteners which are used to attach fastening members to support structures include screws, bolts, and tacks.

The fastening members 32 must support the cladding and resist loads without compacting, crushing, or deforming the insulation 17 which may be placed between the fastening member 32 and the stud 8. Mineral wool insulation is especially vulnerable to crushing, and its surface cannot be used to support the load exerted by the cladding and associated structures. For that reason, when mineral wool insulation is used in a wall, fastening members used to support cladding must do so in a way that does not transfer any of the load from the cladding on to the insulation. The fastening members must support the weight of the cladding and all environmental loads on the cladding, and must transfer force to the studs 8 rather than mineral wool insulation. The cladding may be separated from the studs by several inches of insulation, and so the force exerted by that cladding and borne by the brackets or girts is increased by the lever effect.

The structure conventionally used to accomplish these tasks is shown in FIG. 1. Metal studs 8 form the support structure 14 of the wall. Sheathing 22 such as gypsum board or a similar structure is placed in contact with the studs 8. A fastening member 32 such as a Z girt 21 is held in place proximal to the gypsum board by a bolt or screw 23 which extends through the Z girt and the gypsum board and attaches to the metal stud 8. Cladding is attached to the distal end of the Z girt 24. The cladding creates a gap 26 of several inches in which insulation 17 may reside. The Z girt 21 in combination with the metal screw or bolt 23 forms a thermal bridge which extends through the insulation 16 from the stud 8 to the exterior of the building 28.

This thermal bridge reduces the R value of the wall construct. The conventional approach to this problem is to use a thicker layer of insulation. However, the inventor has discovered that thicker insulation does not resolve the problem of heat loss through thermal bridging. Instead, the inventor has discovered that the use of thermal isolators can have an unexpected beneficial impact on heat loss due to fastener thermal bridges, and does not adversely impact the integrity of the fastener systems.

Disclosed herein is a system and method for interruption of thermal bridges formed by fastening systems which does not compromise the function or structural integrity of those fastening systems.

Thermal isolation system components are made from ceramics or polymers. Suitable polymeric materials include nylon, polyamide, polyester, PVC, polyoxymethylene, or the like, or blends thereof. Preferably they are highly crystalline or highly cross-linked thermoplastic materials, but thermoset materials can also be used. Preferably, the thermal isolator system components are molded, but they could be machined or even extruded.

As shown in FIGS. 2-16, the thermal isolator system comprises a plate 30 suitable for attachment to a metal fastening member 32 such as a bracket or girt. The plate 30 has a size and shape suitable to be approximately coextensive with that portion of the surface of a fastening component 32 which is in contact or communication with a portion of the support structure or additional fastening member. The plate may cover an entire face of a fastening member but may not extend significantly beyond the face of that fastening member. The thermal isolation plate 30 fits between metal components, as shown for example in FIG. 18, in order to reduce or eliminate metal to metal contact. Heat transfer between metal components via conduction is minimized because contact is minimized or prevented by the insulating properties of the isolation plate.

The plate has a body which may have a variety of cross sections and shapes, as shown in FIGS. 2-16. It may be substantially flat. Alternatively, it may define an interior air space 34 for additional insulation value, as shown for example in FIGS. 5-7 and 9-11. The air space 34 is defined by peripheral walls 36. Reinforcing members 38 within the peripheral walls impart strength and rigidity to the structure. One of ordinary skill in the art will appreciate that the reinforcing members can be present in a variety of different configurations. The reinforcing members should define apertures 40 as discussed below.

Figures 2, 3:
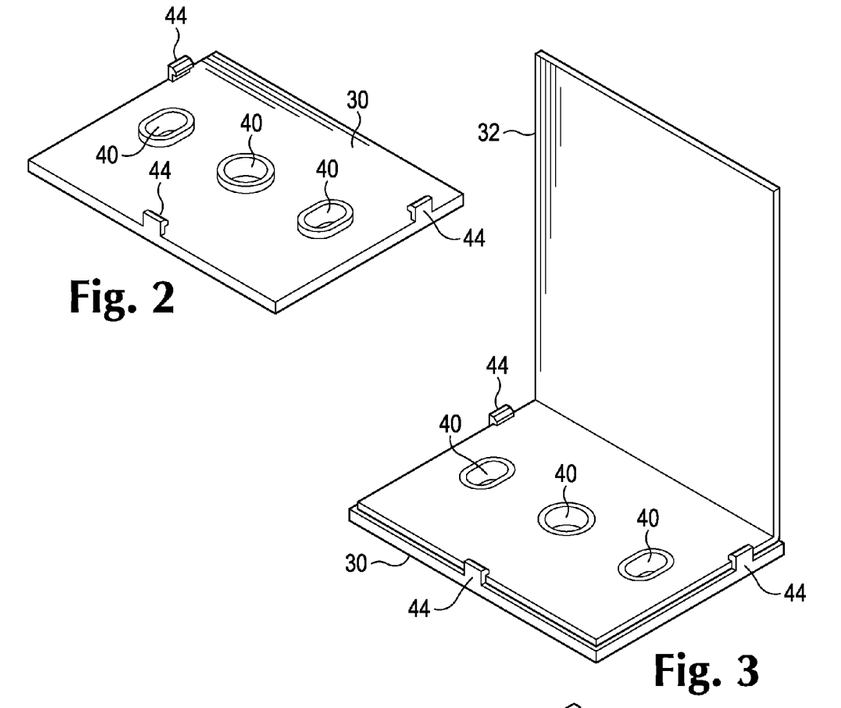
FIG. 2 is a perspective view of one embodiment of the isolating plate disclosed herein.
FIG. 3 is a perspective view of one embodiment of the isolating plate disclosed herein mounted on a bracket.
Figure 4:
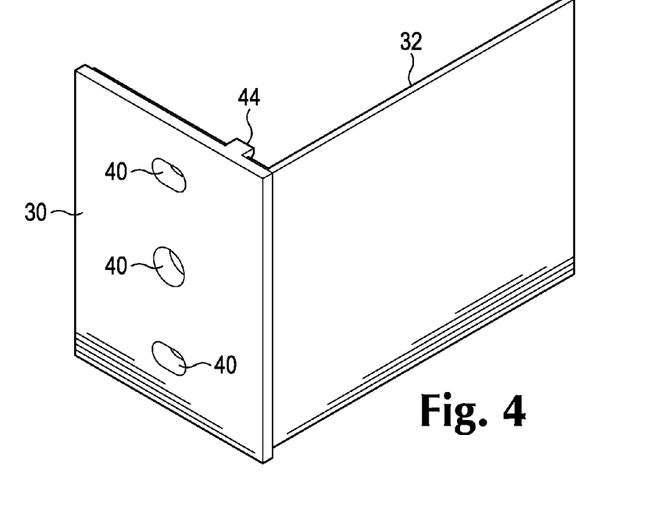
FIG. 4 is a perspective view of one embodiment of the isolating plate disclosed herein mounted on a bracket.
Figures 5, 6:
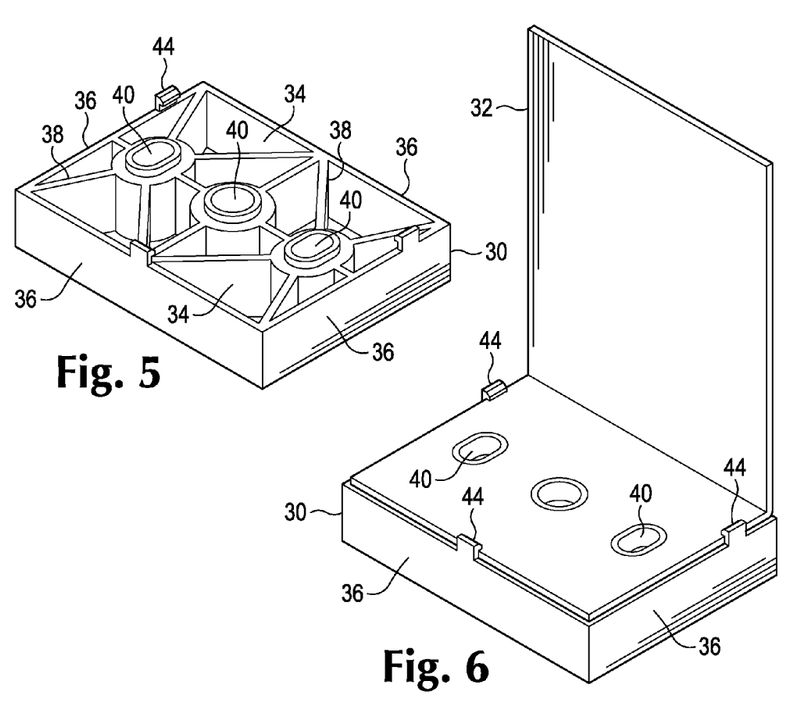
FIG. 5 is a perspective view of one embodiment of the isolating plate disclosed herein.
FIG. 6 is a perspective view of one embodiment of the isolating plate disclosed herein mounted on a bracket.
Figure 7:
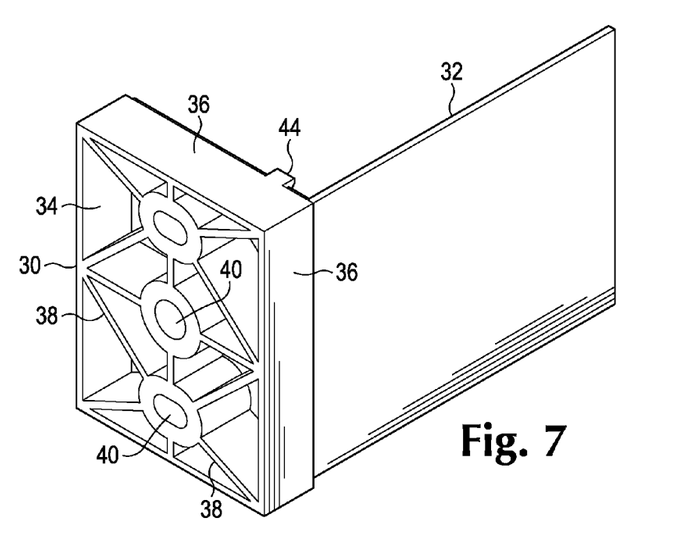
FIG. 7 is a perspective view of one embodiment of the isolating plate disclosed herein mounted on a bracket.
Figures 8, 9, 10, 11, 12, 13, 14:
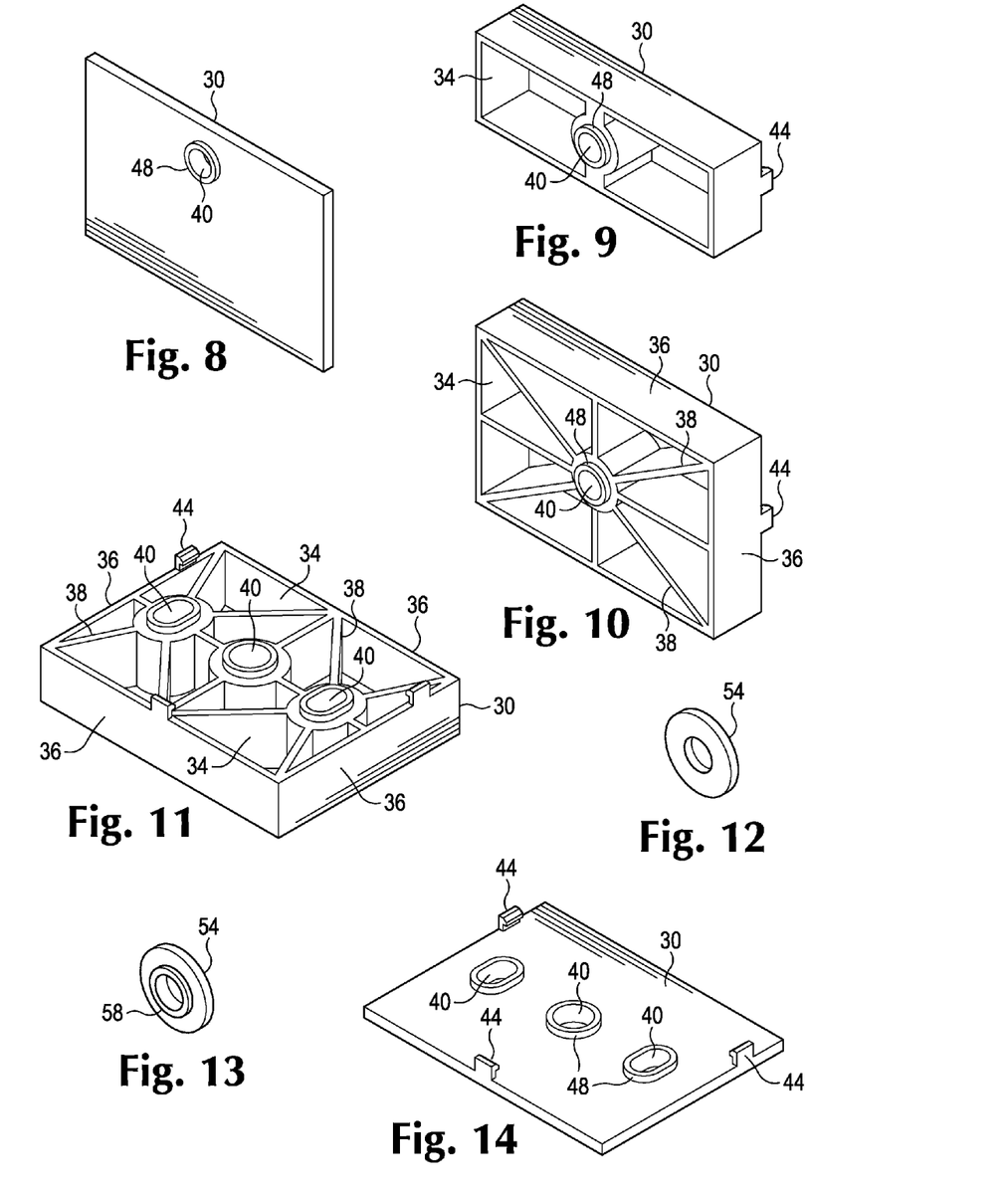
FIG. 8 is a perspective view of one embodiment of the isolating plate disclosed herein.
FIG. 9 is a perspective view of one embodiment of the isolating plate disclosed herein.
FIG. 10 is a perspective view of one embodiment of the isolating plate disclosed herein.
FIG. 11 is a perspective view of one embodiment of the isolating plate disclosed herein.
FIG. 12 is a perspective view of one embodiment of the isolating washer disclosed herein.
FIG. 13 is a perspective view of one embodiment of the isolating washer disclosed herein.
FIG. 14 is a perspective view of one embodiment of the isolating plate disclosed herein.
Figures 15, 16, 17, 18:
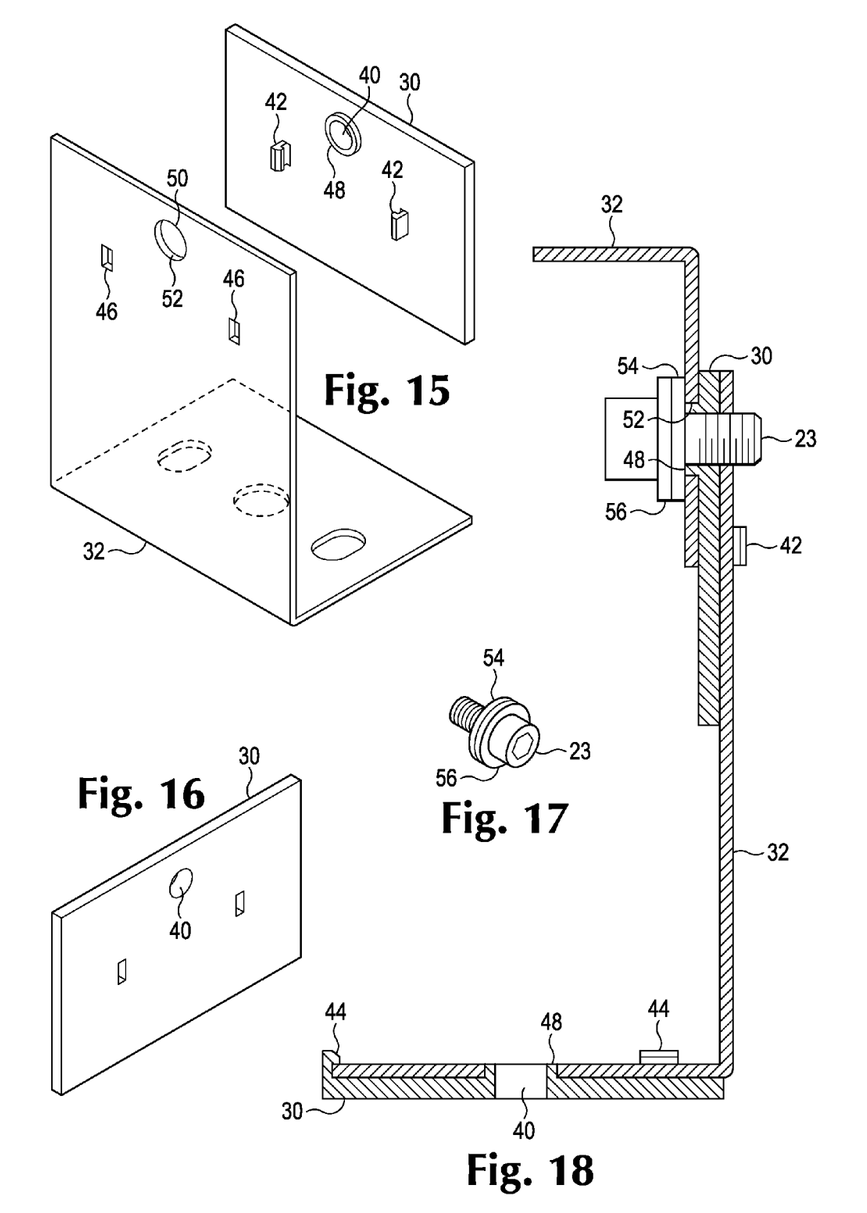
FIG. 15 is a perspective view of one embodiment of the isolating plate disclosed herein and a bracket upon which it may be mounted.
FIG. 16 is a perspective view of one embodiment of the isolating plate disclosed herein.
FIG. 17 is a perspective view of a fastener with one embodiment of the isolating washer disclosed herein mounted upon it.
FIG. 18 is a cross sectional view of a girt and a bracket attached thereto with one embodiment of the thermal isolation system disclosed herein used.
Figure 19:
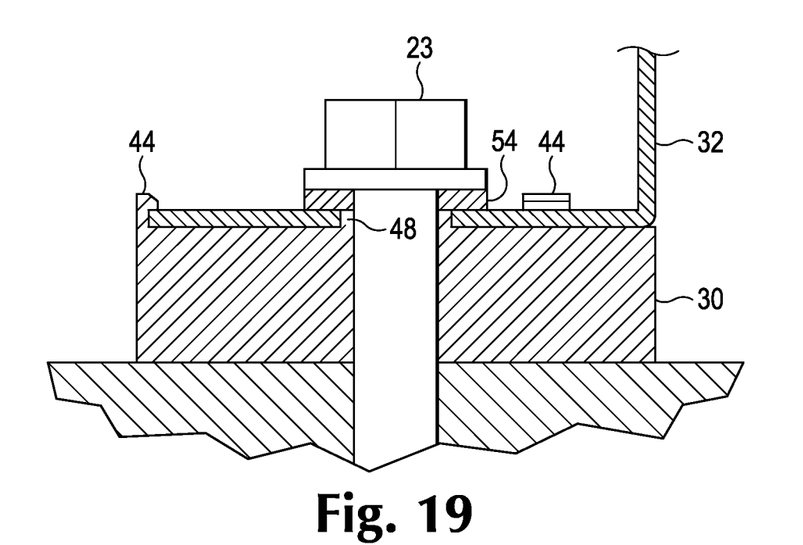
FIG. 19 is a cross sectional view of a fastening member and isolating washer and plate.

The plate includes optional positioning structures such as tabs 42 or hooks 44 which may correspond to the edges of a fastening member such as a bracket or girt, as shown, for example, in FIGS. 2-4, or to notches 46 in the bracket or girt, as shown in FIG. 15. Tabs 42 or other such protrusions insert into notches 46 or grooves in brackets or girts. Hooks 44 on one or more sides of the plate correspond to the edges of a bracket or girt and embrace those edges. Alternatively, a bracket or girt could be wedged between two or more protrusions on the edges of a thermal isolation plate. The positioning structures permit the thermal isolation plate to be removably attached to a bracket or girt during construction. The positioning structures hold the thermal isolation plate in position as the wall assembly is constructed. Alternatively or additionally, brackets or girts can be sold with isolation plates already attached, either through tabs or hooks or through means such as adhesive.

Where the girt or bracket contains one or more openings 50 for receiving a fastener such as a bolt or screw, the thermal isolator plate has a corresponding aperture 40. The plate aperture 40 may have an annular protrusion 48 which extends through the opening 50 in the girt or bracket. The annular protrusion 48 has an internal diameter which is sized to receive a screw or bolt, and the annular protrusion prevents the screw or bolt from contacting the interior surface 52 of the opening in the bracket or girt.

Figure 20:
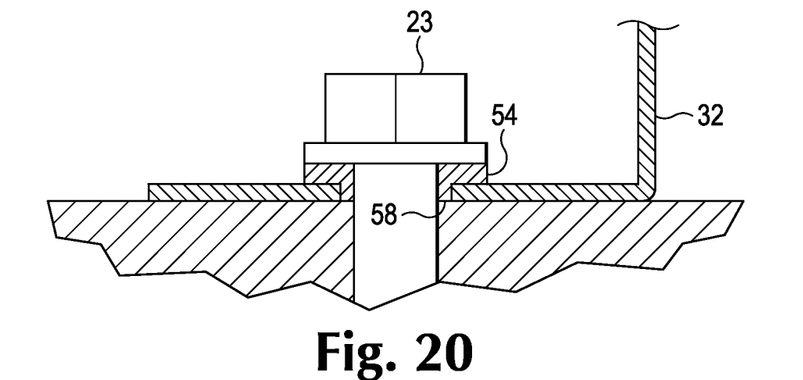
FIG. 20 is a cross sectional view of a fastening member and isolating washer and plate.

The thermal isolator system also can include a washer 54 also made of a ceramic or a polymer. The thermal isolator washer 54 can be attached to a metal washer 56. It must be sized so as to have an outer diameter larger than the head of the screw or bolt 23, and must have an inner diameter that fits around the shaft of the bolt or screw 23. A thermal isolator washer may have a shoulder 58 which fits into an opening in a plate or girt that accommodates a screw or bolt 23, as shown for example in FIG. 20.

Figure 21:
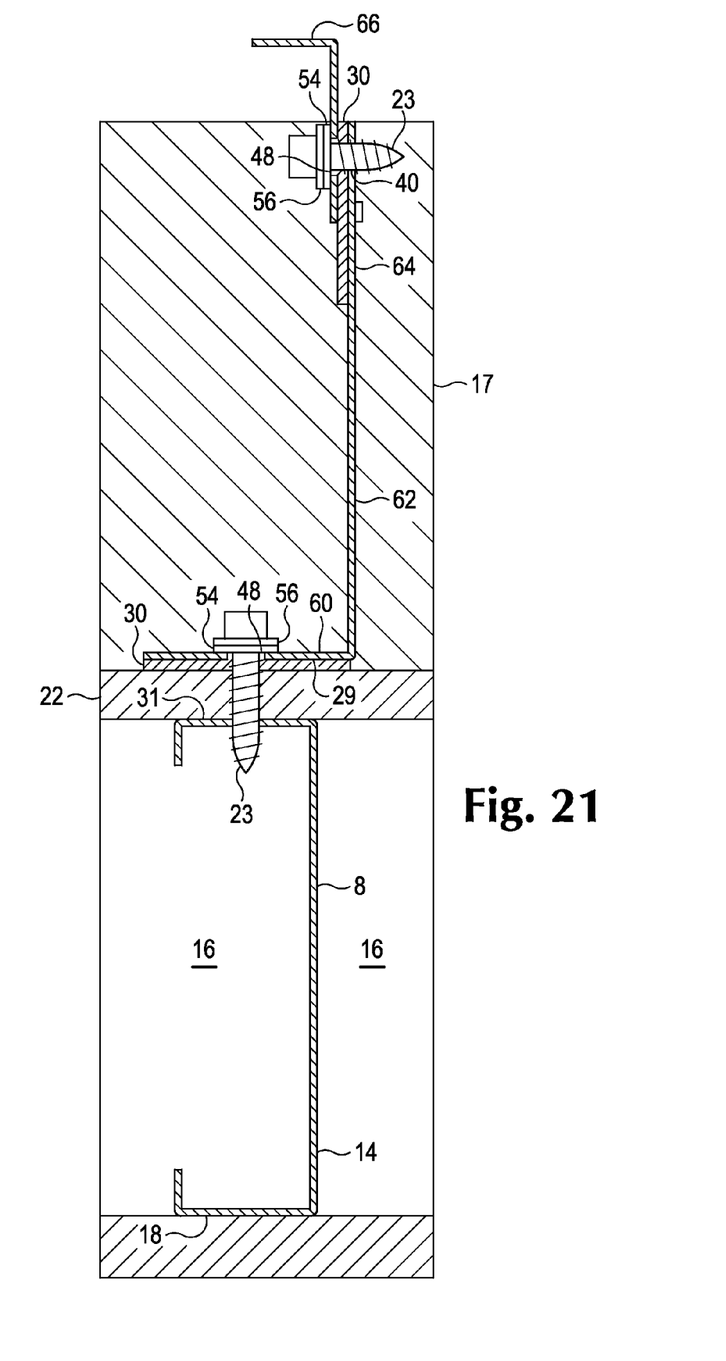
FIG. 21 is a cross sectional view of a wall assembly employing one embodiment of the invention disclosed herein.

As shown in FIG. 21, a screw or bolt 23 extends through the base 60 of a girt 62 and into a stud 8. A thermal isolating washer 54 separates the bolt 23 from the girt 62 so that there is no unbroken metal to metal thermal bridge between the stud 8 and the bracket. At the distal end of the girt 64, a bracket 66, which may be used to attach cladding to the structure, is attached with an additional fastener 22. A thermal isolation plate 30 with an annular protrusion 48 which fits within the opening 40 in the brackets separates the two metal fastening members 62 and 66 and prevents the screw from contacting the inner surface of the openings in the two brackets. A thermal isolating washer 54 prevents the metal head of the screw from contacting the metal bracket 66. In this way, there is no thermal bridge between the stud and the outside of the building 28.

Acting in concert, wherever two metal components are fastened to one another, one or more thermal isolator washers and plates can be used to prevent metal components from contacting one another, and to prevent contact between the bolt head and a metal component, thus preventing the creation of thermal bridges. Additional washers or plates can optionally be used, for example between a nut and a plate. These thermal isolator system components can be used whenever metal systems are fastened together in building construction. Because these thermal isolation system components are specifically placed within the construction, they have a surprisingly positive effect on the R value of a wall, but do not add significantly to the cost or labor intensivity of construction. They also do not negatively affect the function of the fastener systems, gifts, or brackets used in construction.

Conventionally, Z girts are used to attach insulation to building envelopes. Z girts are fastened to the studs, perhaps through sheathing. Strips of insulation are installed between the Z girts so that the Z girts boarder the insulation strips. In this way, Z girts offer continuous support to the edges of a panel of insulation, and insulation such as mineral wool requires that level of support in order to avoid being deformed by its own weight or the weight of adjacent components such as cladding. Dow has recently invented and THERMAX foam boards, which are strong enough to eliminate the need for a separate sheathing requirement. Builders have been using conventional building techniques such as Z girts to attach THERMAX boards directly to support structures. However, this building method has a tremendous disadvantage, in that it creates substantial thermal bridges between the studs and the outside of the building. The Z girts directly contact the studs via fasteners, and extend through the insulation layer. This structure causes a loss of up to 50% of the R-value of the wall.

The inventor has developed a new girt apparatus and building method which take advantage of the structural properties and material characteristics of foam wall boards such as THERMAX to create a wall construct with no thermal bridges.

Figure 22:
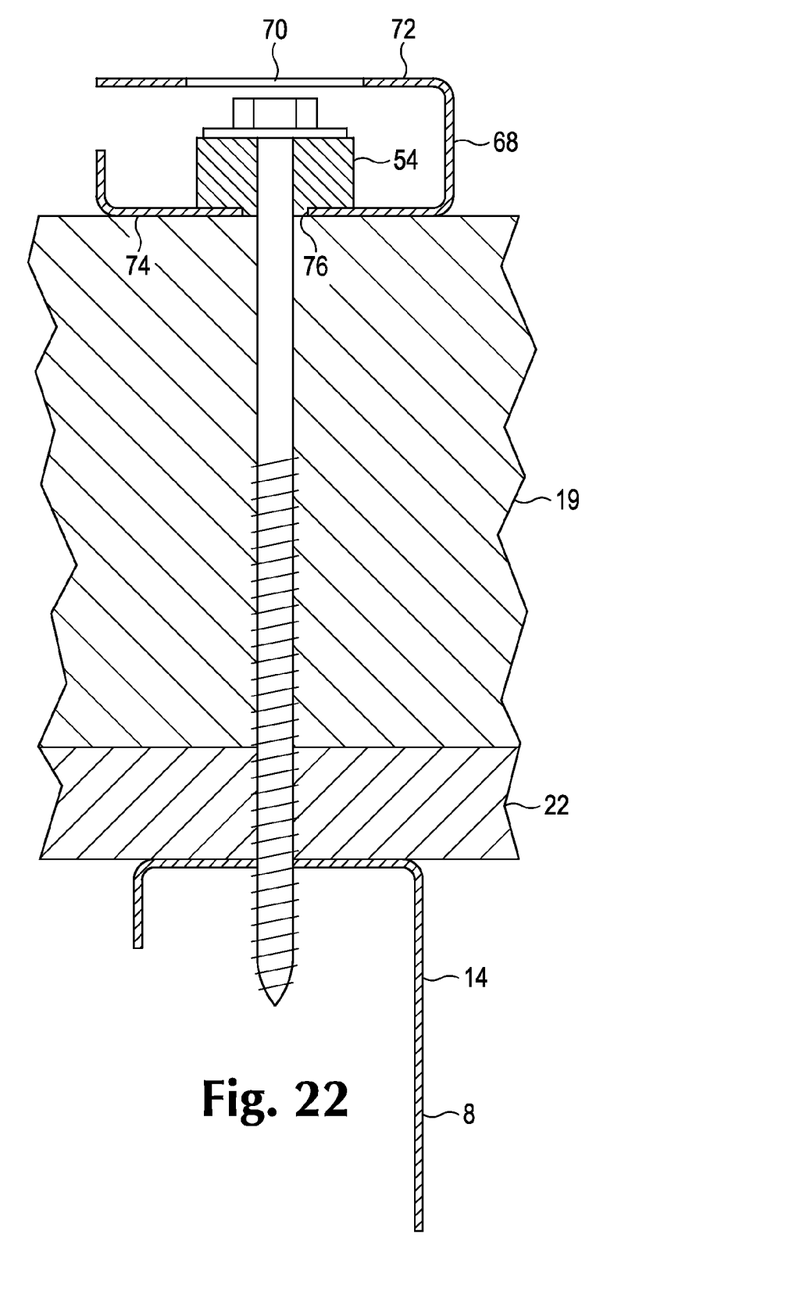
FIG. 22 is a cross sectional view of one embodiment of the invention disclosed herein.
Figure 23:
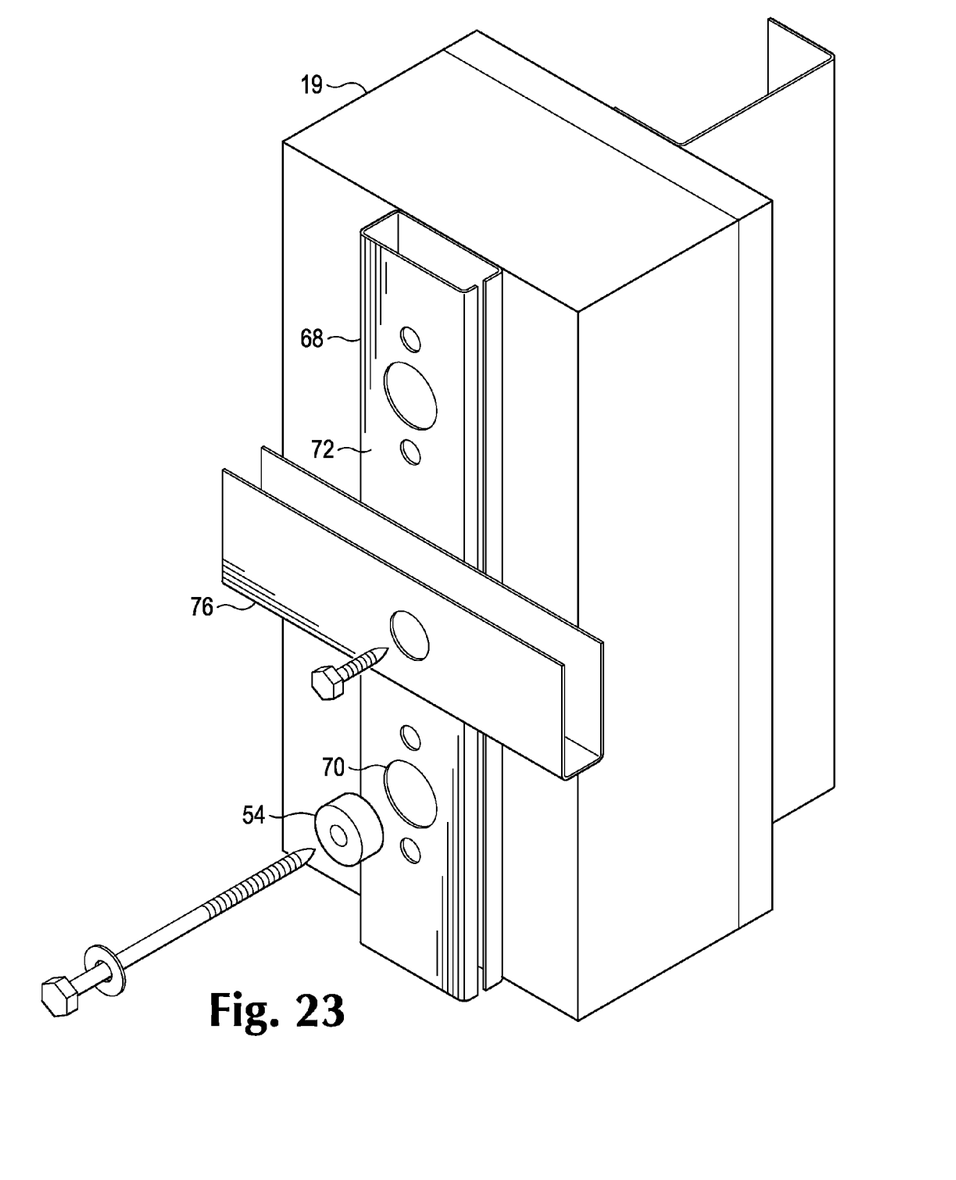
FIG. 23 is a perspective view of one embodiment of the invention disclosed herein.

A CI girt 68 preferably has a box shape, having a square or rectangular cross section which creates a rigid structural element, as shown in FIGS. 22 and 23. It can have three or four sides, and one side may be broken. The girt has openings 70 in the external facing side 72 large enough to accommodate the heads of fasteners, so that the entire fastener can be inserted through the opening 70 in the external facing side 72. The internal facing side 74 has corresponding openings 76 which may be threaded.

In accordance with the inventive method, insulation panels 18 such as foam wall boards are held against the structural support 14 in a known manner. CI girts 68 are placed against the outward facing side of the insulation panels 18 and aligned with the studs 8 in the support structure. Screws or bolts which carry thermal isolating washers 54 are inserted through the openings 70 in the external facing side of the CI girt 68, and are passed through the insulation panel 18 and into the steel stud 8.

The insulation panels abut one another, and can be sealed in a conventional manner. The CI girt is fastened outside of the insulation panels. The insulation panels separate the CI girts from the studs. The only metal component which breaks the insulation layer is the fastener used to fasten the CI girt to the studs. A thermal isolation washer is used to interrupt thermal bridging otherwise caused by that fastener. In this way, foam wall boards are used in a way that provides truly continuous insulation. Additionally, the CI girt's rigid shape transfers wind and gravity load evenly to the surface area of the insulation, which makes it possible to add heavier cladding.

In contrast, conventional insulation panels are placed between Z girts so that no insulation separates the Z girts from the studs and Z girts border the insulation panels, and substantial thermal bridges are created.

A fastening system for the attachment of cladding 76 can then be affixed to the CI girts using fasteners which do not extend through the insulation panels, which permits the CI girts to both attach the insulation panels to the studs and to attach the cladding to the building envelope.

A moisture proof membrane or other envelope materials can be placed between the CI girts and the insulation panels, or between the insulation panels and the studs.

Thermal modeling and analysis of wall assemblies demonstrates that the use of the inventive CI girts and thermal isolation system provides a significant and unexpected benefit in R value.

Morrison Hershfield, an independent third party, conducted a thermal analysis to determine the effective R values of wall assemblies which employed Z girts to attach THERMAX wall boards to metal studs and wall assemblies which employed the inventive CI girts and thermal isolator washers to attach wall board to metal studs in a way that avoided the creation of thermal bridges.

Cases G through F were modeled. Cases G and H employed conventional girts and no thermal isolators, and cases I though J employed CI girts with thermal isolators.

TABLE 3

Assembly U-Values and Effective R-Values for modeled cases with no interior insulation

| Case | Exterior Insulation Thickness (In) | Exterior Insulation Nominal R-Value (hr · ft² · °F./BTU) | Assembly Nominal R-Value (hr · ft² · °F./BTU) | Assembly U-Value (hr · ft² · °F./BTU) | Assembly Effective R (hr · ft² · °F./BTU) | % Effective |
|---|---|---|---|---|---|---|
| G Vertical Girts (Girts spaced horizontally 16"o.c., no interior sprayfoam) | 1.55 | 10.1 | 13.3 | 0.118 | 8.4 | 63% |
| H Horizontal Girts (Girts spaced vertically 24"o.c., no interior sprayfoam) | 1.55 | 10.1 | 13.3 | 0.105 | 9.5 | 71% |
| I CI System (Fasteners vertically spaced 16"o.c., no sprayfoam) | 1.55 | 10.1 | 12.8 | 0.080 | 12.5 | 98% |
| J CI System (Fasteners vertically spaced 16"o.c., no sprayfoam) | 3.00 | 19.0 | 21.7 | 0.048 | 20.7 | 95% |

The results establish that the inventive systems for minimizing thermal bridges work extremely well. In cases H and G, the thermal bridging created by the conventional use of girts cost the insulation 29% and 37% of its effectiveness. In contrast, when CI girts and thermal isolators were used, the invention maintained 95% and 98% of its effectiveness. Cases I and J had effective R values which were very close to their nominal R values. Case I actually had a lower nominal R value than cases G or H. The conventional thinking in this field would expect that Case I would have a lower effective R value, however, due to the use of an embodiment of the invention disclosed and claimed herein, it had a significantly higher effective R value.

We claim:

1. A system for reducing the conduction of thermal energy between two metal components of a wall assembly, the two metal components including a wall stud and a fastening member, the system comprising:
    an isolator plate adapted to be placed between the wall stud and the fastening member, said fastening member having a first side adapted to be placed opposite an outside facing aspect of the wall stud, wherein the isolator plate consists of a thermal insulating material having lower thermal conductivity than a thermal conductivity of the wall stud and the fastening member and is sized to be approximately coextensive with the first side of the fastening member, wherein the isolator plate includes at least one first opening for receiving a fastener, and wherein the isolator plate further includes at least one positioning structure spaced from the first opening and configured to attach the isolator plate to the fastening member.

2. The system of claim 1 further comprising an isolating washer comprising insulating material and adapted to encircle a shaft of the fastener.

3. The system of claim 2, wherein the isolating washer further comprises a layer composed of metal.

4. The system of claim 1, wherein the thermal insulating material comprises a polymeric or ceramic material.

5. The system of claim 1, wherein the at least one positioning structure includes tabs for removably affixing the isolator plate to the fastening member.

6. The system of claim 1, wherein the isolator plate includes an interior air space.

7. The isolator system of claim 1, wherein the isolator plate includes an annular shoulder adapted to extend into a second opening of the fastening member.

8. The isolator system of claim 1, wherein the at least one positioning structure is configured to removably attach the isolator plate to the fastening member.

9. The isolator system of claim 1, wherein the at least one positioning structure is disposed at a perimeter of the isolator plate.

10. A wall assembly comprising:
    a support structure comprising metal studs, wherein a sheathing is attached to an outside facing aspect of the metal studs;
    a fastening member comprising metal, the fastening member having a first side adjacent to a side of the sheathing opposite the outside facing aspect of the metal studs;
    an isolator plate comprising insulating material and located in and configured to be approximately coextensive with a region defined between the first side of the fastening member and the sheathing;
    a fastener extending through an opening in the support structure, an opening in the fastening member, and an opening in the isolator plate; and
    wherein the isolator plate includes a positioning structure spaced from the opening in the isolator plate and configured to attach the isolator plate to the fastening member.

11. The wall assembly of claim 10 further comprising an isolating washer comprising insulating material and adapted to encircle a shaft of the fastener.

12. The wall assembly of claim 11, wherein the isolating washer further comprises a layer composed of metal.

13. The wall assembly of claim 10, wherein the insulating material comprises a polymer.

14. The wall assembly of claim 10, wherein the isolator plate includes tabs for removably affixing the isolator plate to the fastening member.

15. The wall assembly of claim 10, wherein the isolator plate includes an interior air space.

16. The wall assembly of claim 10, wherein the isolator plate includes an annular shoulder adapted to extend into the opening in the fastening member.

* * * * *